(12) United States Patent
Huang et al.

(10) Patent No.: US 11,301,005 B2
(45) Date of Patent: Apr. 12, 2022

(54) DISPLAY ASSEMBLY AND PORTABLE ELECTRONIC DEVICE

(71) Applicant: Acer Incorporated, New Taipei (TW)

(72) Inventors: Yi-Ta Huang, New Taipei (TW); Cheng-Nan Ling, New Taipei (TW); Wen-Chieh Tai, New Taipei (TW)

(73) Assignee: Acer Incorporated, New Taipei (TW)

( * ) Notice: Subject to any disclaimer, the term of this patent is extended or adjusted under 35 U.S.C. 154(b) by 32 days.

(21) Appl. No.: 16/908,693

(22) Filed: Jun. 22, 2020

(65) Prior Publication Data

US 2021/0247813 A1 Aug. 12, 2021

(30) Foreign Application Priority Data

Feb. 12, 2020 (TW) .................................. 109104338

(51) Int. Cl.
*G06F 1/16* (2006.01)

(52) U.S. Cl.
CPC .......... *G06F 1/1681* (2013.01); *G06F 1/1618* (2013.01)

(58) Field of Classification Search
CPC .... G06F 1/1601; G06F 1/1613; G06F 1/1616; G06F 1/1624; G06F 1/1633; G06F 1/1637; G06F 1/1684; G06F 1/20; G06F 1/203; G06F 2200/1612; G06F 2200/1613; G06F 2200/163; G06F 2200/201

See application file for complete search history.

(56) References Cited

U.S. PATENT DOCUMENTS

| | | | | |
|---|---|---|---|---|
| 4,814,759 A | * | 3/1989 | Gombrich | G06F 1/1601 345/60 |
| 5,900,848 A | * | 5/1999 | Haneda | G06F 1/1677 345/1.1 |
| 5,991,150 A | * | 11/1999 | Chiu | G06F 1/1609 359/742 |
| 6,212,069 B1 | * | 4/2001 | Janik | G06F 1/1616 165/86 |
| 6,229,693 B1 | * | 5/2001 | Karidis | G06F 1/1616 361/679.05 |
| 6,243,261 B1 | * | 6/2001 | Janik | G06F 1/1615 361/679.46 |
| 6,504,707 B2 | * | 1/2003 | Agata | G06F 1/1616 248/919 |
| 7,988,113 B2 | * | 8/2011 | Yang | G06F 1/1601 248/276.1 |
| 8,306,584 B2 | * | 11/2012 | Yeh | H04M 1/0237 455/575.4 |

(Continued)

FOREIGN PATENT DOCUMENTS

| | | |
|---|---|---|
| CN | 1954282 | 4/2007 |
| KR | 100890629 | 3/2009 |

(Continued)

*Primary Examiner* — Anthony Q Edwards
(74) *Attorney, Agent, or Firm* — JCIPRNET

(57) ABSTRACT

A display assembly including a body, a display module, and a transmission module is provided. The body has a datum surface. The display module has a display surface. The transmission module is disposed in the body and is linked to the display module, wherein the transmission module drives the display module to move away from or close to the body, so as to drive the display surface to be lifted up or lowered down relative to the datum surface. A portable electronic device is also provided.

18 Claims, 6 Drawing Sheets

(56) References Cited

U.S. PATENT DOCUMENTS

| | | | | |
|---|---|---|---|---|
| 2002/0018337 A1* | 2/2002 | Nakamura | ............... | G06F 1/166 |
| | | | | 361/697 |
| 2002/0044411 A1* | 4/2002 | Iredale | .................. | G06F 1/1616 |
| | | | | 361/679.05 |
| 2002/0126110 A1* | 9/2002 | Bowron | ................. | F16M 11/10 |
| | | | | 345/204 |
| 2004/0085734 A1* | 5/2004 | Ishikawa | ............... | F28D 1/0308 |
| | | | | 361/704 |
| 2004/0108995 A1* | 6/2004 | Hoshino | ................. | G06F 3/016 |
| | | | | 345/173 |
| 2004/0125549 A1 | 7/2004 | Iredale | | |
| 2008/0265113 A1* | 10/2008 | Lin | ........................ | F16M 11/38 |
| | | | | 248/176.3 |
| 2011/0216483 A1* | 9/2011 | Vesely | ................. | G06F 1/1624 |
| | | | | 361/679.01 |
| 2012/0175478 A1* | 7/2012 | Chen | ..................... | G06F 1/1624 |
| | | | | 248/286.1 |
| 2012/0217855 A1* | 8/2012 | Chen | ..................... | G06F 1/1616 |
| | | | | 312/323 |
| 2019/0129474 A1* | 5/2019 | Chen | ....................... | F03G 7/065 |
| 2019/0138054 A1 | 5/2019 | Alva et al. | | |
| 2021/0271293 A1* | 9/2021 | Rakshit | ................... | B25J 9/163 |

FOREIGN PATENT DOCUMENTS

| | | |
|---|---|---|
| KR | 20090099242 | 9/2009 |
| TW | 201933398 | 8/2019 |
| TW | M583668 | 9/2019 |

\* cited by examiner

DISPLAY ASSEMBLY AND PORTABLE ELECTRONIC DEVICE

CROSS-REFERENCE TO RELATED APPLICATION

This application claims the priority benefit of Taiwan application serial no. 109104338, filed on Feb. 12, 2020. The entirety of the above-mentioned patent application is hereby incorporated by reference herein and made a part of this specification.

BACKGROUND

Technical Field

The disclosure relates to a display assembly and a portable electronic device.

Description of Related Art

With the development of technology, people's pursuit of high-efficiency and high-standard visual enjoyment of electronic products is getting stronger, so as to enrich better product usage experiences. For example, the screen frame of a notebook computer is narrower than in the past, such that the display surface can be made larger on a screen of the same size, thereby improving the viewing experience.

However, even so, the existing frame is still clearly visible to the user and the effect of completely eliminating the frame cannot be achieved visually.

SUMMARY

The disclosure provides a display assembly and a portable electronic device, wherein a display module thereof is lifted up relative to a body by a transmission module, so as to provide a frameless effect visually.

The display assembly of the disclosure includes a body, a display module, and a transmission module. The body has a datum surface. The display module has a display surface. The transmission module is disposed in the body and is linked to the display module, wherein the transmission module drives the display module to move away from or close to the body, so as to drive the display surface to be lifted up or lowered down relative to the datum surface.

The portable electronic device of the disclosure includes a first body, a display module, a transmission module, and a second body. The first body has a datum surface. The display module is disposed in the first body and has a display surface. The transmission module is disposed in the first body and is linked to the display module. The second body is pivotally connected to the first body. During the pivoting process of the first body relative to the second body, the transmission module drives the display module to move away from or close to the first body, so as to drive the display surface to be lifted up or lowered down relative to the datum surface.

Based on the above, in the display assembly and the portable electronic device having the display module, the transmission module is disposed in the body and is linked to the display module, so that the display surface of the display module may be driven to be lifted up or lowered down relative to the datum surface of the body by the transmission module, such that the display surface generates a floating effect. Viewing the display assembly or the portable electronic device from the user's perspective, a frameless visual effect can be generated.

To make the aforementioned and other features of the disclosure more comprehensible, several embodiments accompanied with drawings are described in detail as follows.

DETAILED DESCRIPTION OF DISCLOSED EMBODIMENTS

Figure 1:
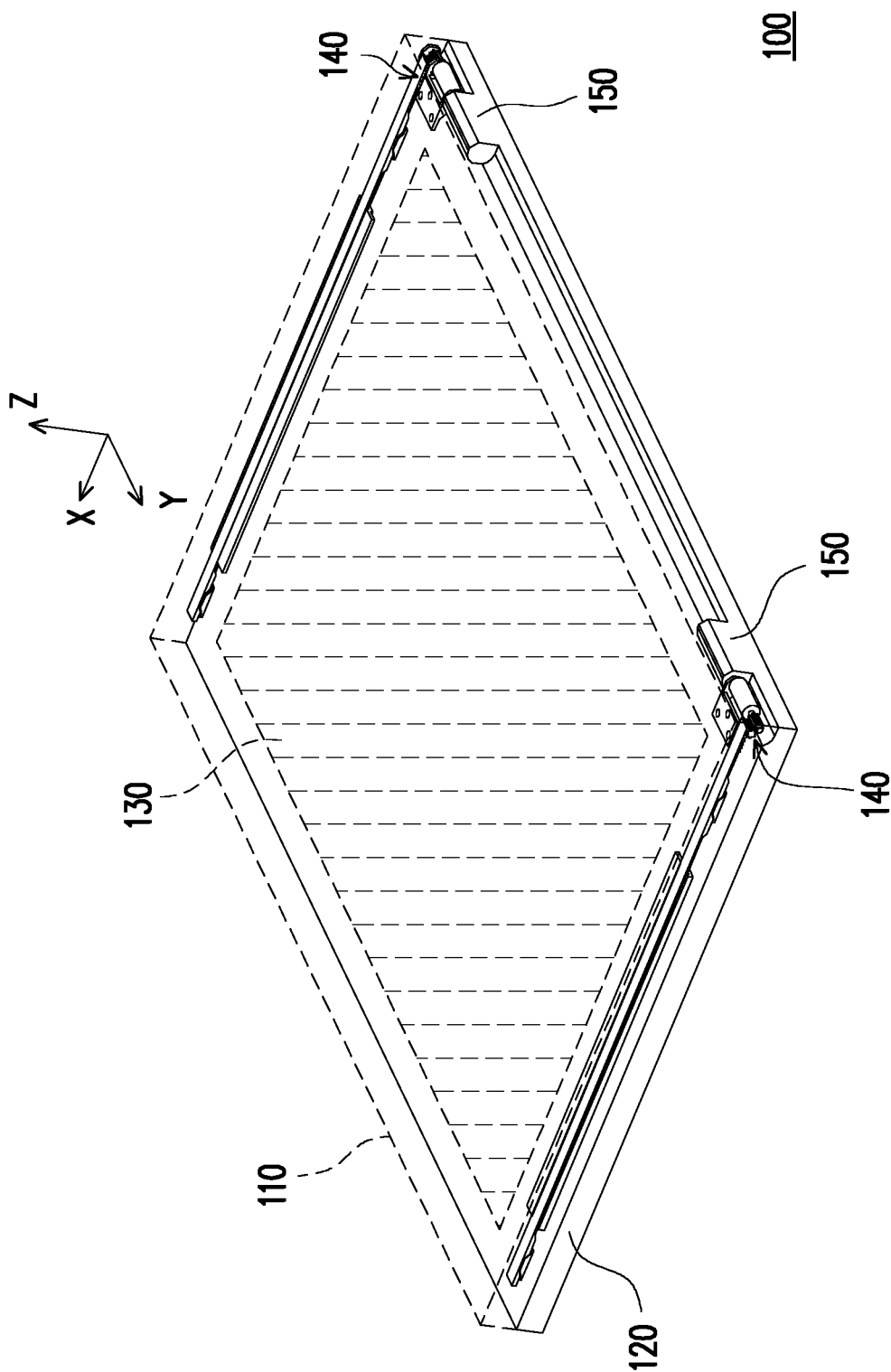
FIG. 1 is a schematic view of a portable electronic device according to an embodiment of the disclosure.
Figure 2:
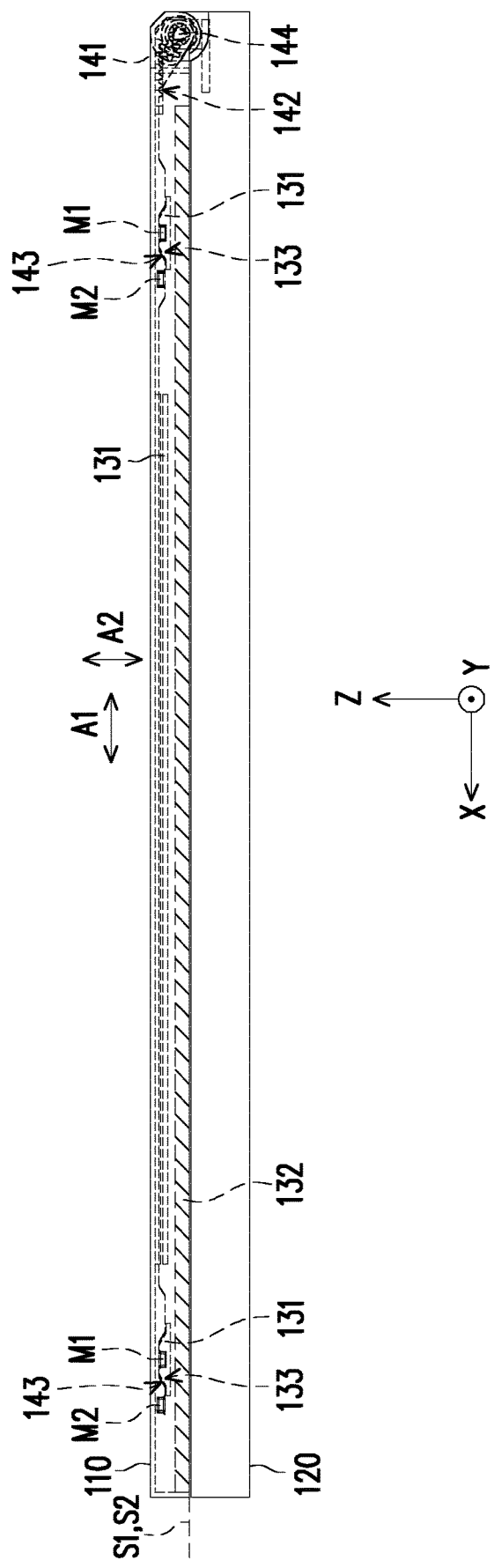
FIG. 2 is a side view of the portable electronic device of FIG. 1.
Figure 3:
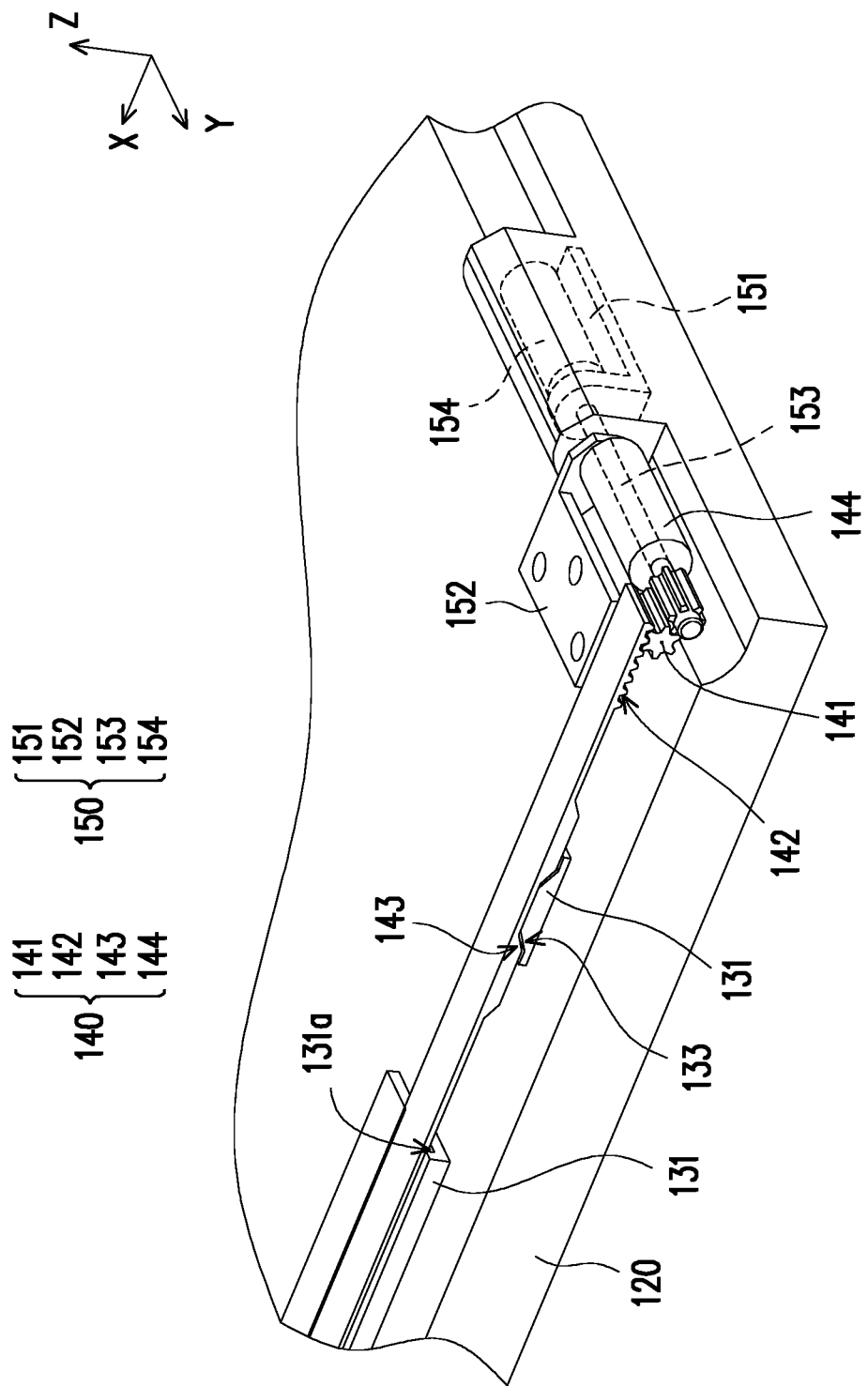
FIG. 3 is an enlarged view of a portion of the portable electronic device of FIG. 1.

FIG. 1 is a schematic view of a portable electronic device according to an embodiment of the disclosure. FIG. 2 is a side view of the portable electronic device of FIG. 1. FIG. 3 is an enlarged view of a portion of the portable electronic device of FIG. 1. The right-angled coordinates XYZ are provided here to facilitate the descriptions of the components. Please refer to FIG. 1 to FIG. 3 at the same time. In the embodiment, a portable electronic device 100 is, for example, a notebook computer, which includes a first body 110, a display module 130, a transmission module 140, a pivot 150, and a second body 120. The first body 110 has a datum surface S1. The display module 130 is disposed in the first body 110 and has a display surface S2. The transmission module 140 is disposed in the first body 110 and is linked to the display module 130. The second body 120 is pivotally connected to the first body 110 by the pivot 150, such that the first body 110 and the second body 120 may be rotated to open and close relative to each other by the pivot 150. At the same time, during the pivoting process of the first body 110 relative to the second body 120, the transmission module 140 drives the display module 130 to move away from or close to the first body 110, so as to drive the display surface S2 to be lifted up or lowered down relative to the datum surface S1. Here, the first body 110, the display module 130, and the transmission module 140 may be regarded as the display assembly of the portable electronic device 100. Of course, in other unshown embodiments, the display assembly may also be applied to other electronic devices with display effects.

In the embodiment, the pivot 150 and the transmission module 140 are disposed in pairs in the first body 110. Since the transmission modules 140 or the pivots 150 on the left and right sides have the same function, subsequent descriptions will be made taking the transmission module 140 and the pivot 150 on one of the sides as the examples.

Figure 4A:
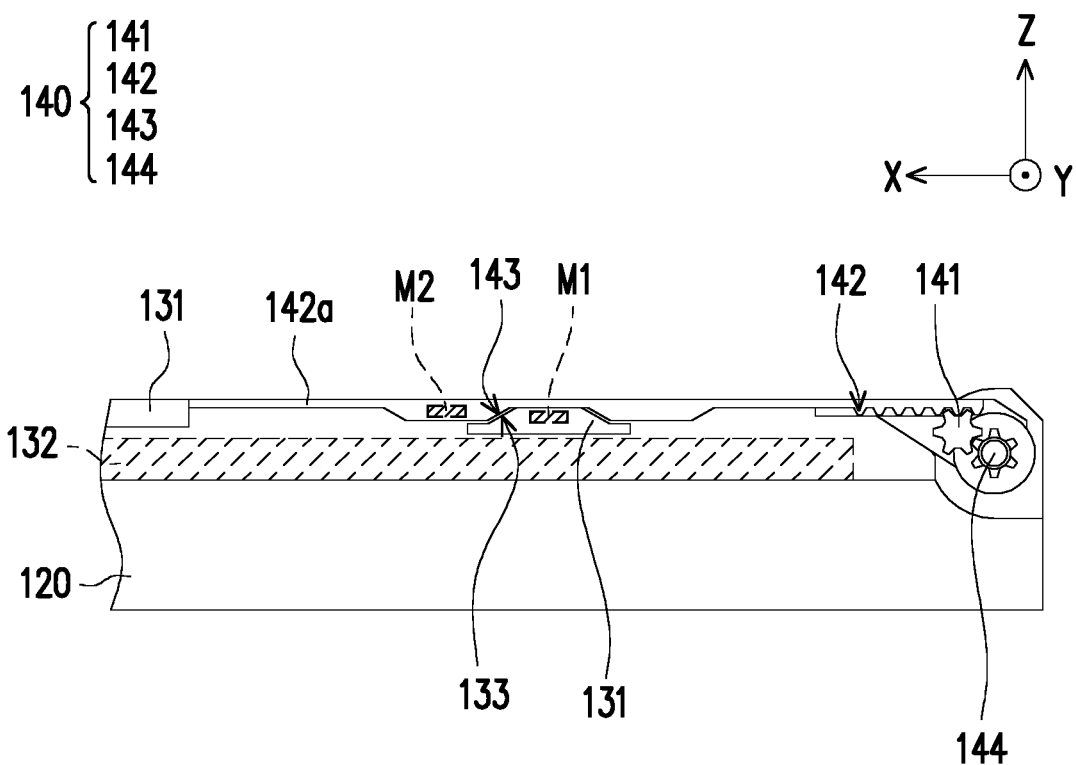
FIG. 4A and FIG. 4B are respectively enlarged views of portions of the portable electronic device of FIG. 2 at different locations.
Figure 4B:
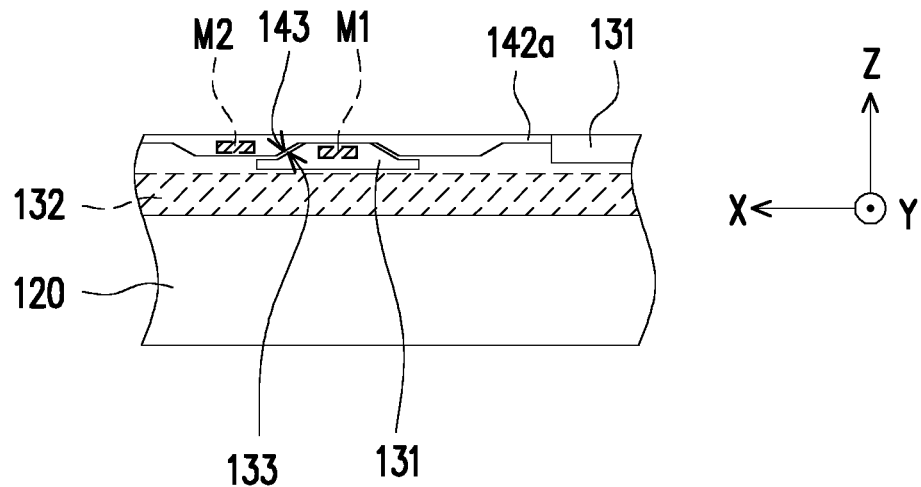

FIG. 4A and FIG. 4B are respectively enlarged views of portions of the portable electronic device of FIG. 2 at different locations. It should be noted that, although FIG. 4A and FIG. 4B are schematic views of the portable electronic device 100 at different locations, the schematic views substantially have the same mechanism features and configurations. Therefore, FIG. 4A will be taken as the example in the following. Please refer to FIG. 2, FIG. 3, and FIG. 4A at the same time. In the embodiment, the transmission module 140 has an active part 143, movably disposed in the first body 110 along a first axis A1 (in FIG. 2, the first axis A1 is parallel to the x-axis). The display module 130 have a driven part 133, located on the movement path of the active part 143. The active part 143 abuts the driven part 133 when moving to lift up or lower down the display module 130 along a second axis A2 (in FIG. 2, the second axis A2 is parallel to the z-axis), wherein the first axis A1 is orthogonal to the second axis A2.

Figure 5A:
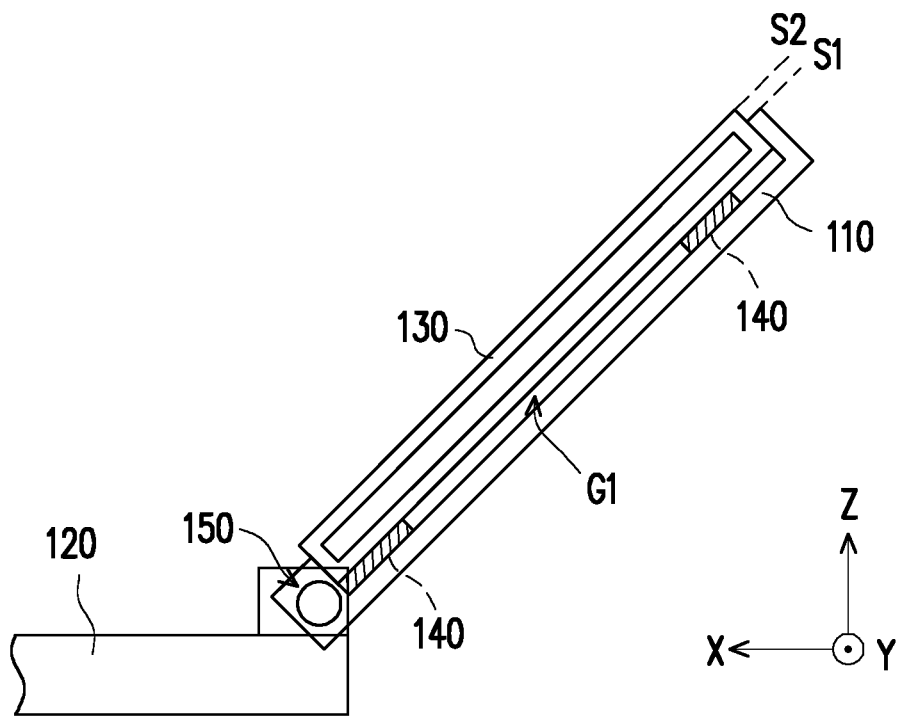
FIG. 5A and FIG. 5B are respectively schematic views of a portion of a portable electronic device in another state.
Figure 5B:
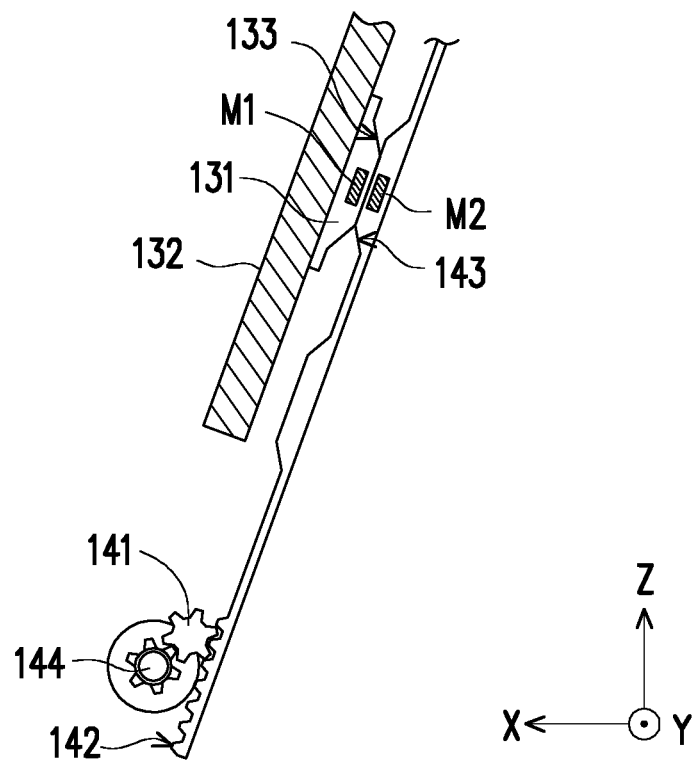

Further, FIG. 5A and FIG. 5B are respectively schematic views of a portion of a portable electronic device in another state. Please refer to FIG. 2, FIG. 4A, and FIG. 5A first. The active part 143 and the driven part 133 are a convex part and a concave part corresponding to each other. When the convex part moves out of the concave part, the display surface S2 is lifted up relative to the datum surface S1, that is, the active part 143 and the driven part 133 of the embodiment are a wedge-shaped concave part and a wedge-shaped convex part with contours complementary to each other. When the active part 143 moves along the first axis A1, the driven part 133 is ejected out from the wedge-shaped concave part due to the component abutment. Therefore, the effect of the display module 130 moving along the second axis A2 and being lifted up is presented.

In detail, please refer to FIG. 2, FIG. 3, and FIG. 4A at the same time. The first body 110 and the second body 120 of the embodiment may be relatively rotated to open and close by the pivot 150. As shown in FIG. 3, the pivot 150 includes supports 151 and 152, a shaft part 153, and a torsion part 154 respectively disposed in the first body 110 and the second body 120, wherein the supports 151 and 152 are pivotally connected together by the shaft part 153, and the torsion part 154 is disposed at the shaft part 153 to provide the torque required when the first body 110 and the second body 120 are relatively rotated to open and close and for support. Furthermore, the transmission module 140 includes a gear 141, a rack 142, a power source 144 (for example, a motor), and the active part 143. The gear 141 is rotatably disposed in the first body 110 and is coupled (meshed) with the gear part of the power source 144. The rack 142 is movably disposed in the first body 110 and is coupled with the gear 141. The active part 143 is located on the rack 142 (the active part 143 and the rack 142 are disposed as the same structure. That is, both are located at a structure body 142a). Here, the power source 144, the first body 110, and the pivot 150 of the second body 120 are coaxially disposed. Correspondingly, the display module 130 includes a bearing member 131 and a display unit 132 disposed thereon. The driven part 133 is located on the bearing member 131. Furthermore, as shown in FIG. 2, the bearing member 131 has a chute structure 131a, configured to enable the plate structure of the rack 142 to be slidably connected therein to smoothly move back and forth along the first axis A1.

Accordingly, when the first body 110 and the second body 120 are relatively rotated to open and close by the pivot 150, the power source 144 drives the rack 142 to move along the first axis A1 by the synchronous rotation of the gear 141, as shown in FIG. 4 and FIG. 5B. The moving rack 142 represents the moving active part 143, which drives the display unit 132 accordingly via the driven part 133.

Figure 6:
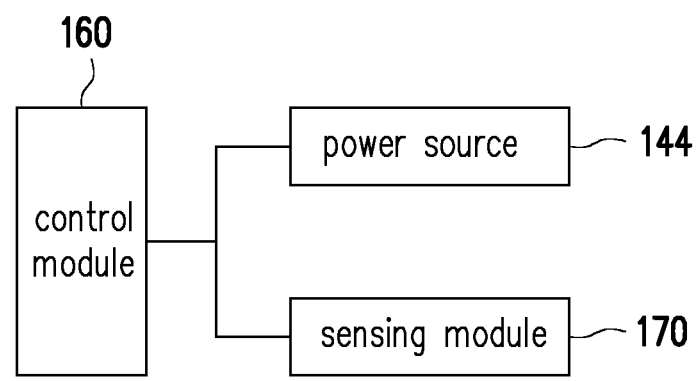
FIG. 6 is a schematic view of electrical connections of some components of a portable electronic device.

FIG. 6 is a schematic view of electrical connections of some components of a portable electronic device. Please refer to FIG. 2 and FIG. 6 at the same time. In the embodiment, the portable electronic device 100 further includes a control module 160 and a sensing module 170, wherein the control module 160 is electrically connected to the power source 144 of the transmission module 140 and the sensing module 170. The sensing module 170 is disposed beside the pivot 150 to sense the pivoting state thereof. When the first body 110 and the second body 120 are relatively rotated to each open and close by the pivot 150, the control module 160 may obtain the pivoting state of the pivot 150 by the sensing module 170, thereby controlling the transmission module 140 accordingly to adjust the corresponding state of the display surface S2 of the display module 130 relative to the datum surface S1 of the first body 110. In the embodiment, when the first body 110 and the second body 120 are relatively opened, the control module 160 drives the display surface S2 to be lifted up relative to the datum surface S1 by the transmission module 140, as shown in FIG. 5A. At this time, a portion of the display module 130 moves out of the first body 110 having a recessed structure, so that a gap G1 is formed between the display module 130 and the first body 110. In addition to lifting up the display surface S2 to provide a frameless effect visually, an additional heat dissipation space may also be provided to the portable electronic device 100 by the gap G1. For example, the second body 120 is the host system, disposed with electronic elements such as a processor, a display chip, etc. therein. When the portable electronic device 100 operates, the electronic elements will generate heat and be regarded as the heat source in the portable electronic device 100. If the heat can be guided into the gap G1 by a heat transfer mechanism, an additional heat dissipation path may be provided to the portable electronic device 100, thereby improving the heat dissipation effect thereof.

In contrast, when the first body 110 and the second body 120 are relatively closed, the control module 160 drives the display surface S2 to be lowered down relative to the datum surface S1 by the transmission module 140, such that the display surface S2 and the datum surface S1 are coplanar and consistent with each other, as shown in FIG. 2 or FIG. 4.

In another embodiment, the user may also adjust the lifting up or lowering down state of the display module 130 relative to the first body 110 by directly controlling the control module 160.

Please refer to FIG. 4A, FIG. 4B, and FIG. 5B again. In the embodiment, the transmission module 140 further includes a magnetic member M2, disposed as the same structure as the active part 143 and adjacent to the active part 143. The display module 130 further includes a magnetic member M1, disposed as the same structure as the driven part 133 and adjacent to the driven part 133. When active part 143 abuts the driven part 133 to lift up the display module 130, the magnetic members M2 and M1 correspond to each other and are magnetically attracted, such that a positioning effect may be provided to the wedge-shaped convex parts when abutting each other by the magnetic members M1 and M2 magnetically attracted to each other, as shown in FIG. 5B.

Based on the above, in the embodiments of the disclosure, in the display assembly and the portable electronic device having the display module, the transmission module is disposed in the body and is linked to the display module, so that the display surface of the display module may be driven to be lifted up or lowered down relative to the datum surface of the body by the transmission module, such that the display surface generates a floating effect. Viewing the display assembly or the portable electronic device from the user's perspective, a frameless visual effect can be generated.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they lowered down within the scope of the following claims and their equivalents.

What is claimed is:

1. A display assembly, comprising:
   a body, having a datum surface;
   a display module, disposed in the body and having a display surface; and
   a transmission module, disposed in the body and linked to the display module, wherein the transmission module drives the display module to move away from or close to the body, so as to drive the display surface to be lifted up or lowered down relative to the datum surface,
   wherein the transmission module has an active part, movably disposed in the body along a first axis, the display module has a driven part, located on a movement path of the active part, the active part abuts the driven part when moving to lift up or lower down the display module along a second axis, and the first axis is orthogonal to the second axis.

2. The display assembly according to claim 1, wherein during a movement process of the display module, the display surface is parallel to the datum surface.

3. The display assembly according to claim 1, wherein the active part and the driven part are a convex part and a concave part corresponding to each other, and when the convex part moves out of the concave part, the display surface is lifted up relative to the datum surface.

4. The display assembly according to claim 1, wherein the active part and the driven part are a wedge-shaped convex part and a wedge-shaped concave part with contours complementary to each other.

5. The display assembly according to claim 1, wherein the transmission module comprises:
   at least one gear, rotatably disposed in the body; and
   a rack, movably disposed in the body and coupled to the gear, wherein the rack has the active part.

6. The display module according to claim 5, wherein the transmission module further comprises a power source, connected to the gear.

7. The display assembly according to claim 1, wherein the display module comprises:
   a bearing member, having the driven part; and
   a display unit, disposed on the bearing member and having the display surface.

8. The display assembly according to claim 1, wherein the transmission module further comprises a magnetic member, disposed as a same structure as the active part and adjacent to the active part, the display module further comprises another magnetic member, disposed in a same structure as the driven part and adjacent to the driven part, and when the active part abuts the driven part to lift up the display module, the magnetic member and the another magnetic member correspond to each other and are magnetically attracted.

9. The display assembly according to claim 1, wherein the body is a recessed structure, when the display surface is lifted up relative to the datum surface, a portion of the display module moves out of the recessed structure and forms a gap between the body, and when the display surface is lowered down relative to the datum surface, the display module moves into the recessed structure such that the display surface and the datum surface are consistent.

10. A portable electronic device, comprising:
    a first body, having a datum surface;
    a display module, disposed in the first body and having a display surface;
    a transmission module, disposed in the first body and linked to the display module; and
    a second body, pivotally connected to the first body, wherein during a process of the first body pivoting relative to the second body, the transmission module drives the display module to move away from or close to the first body, so as to drive the display surface to be lifted up or lowered down relative to the datum surface,
    wherein the transmission module has an active part, movably disposed in the first body along a first axis, the display module has a driven part, located on a movement path of the active part, the active part abuts the driven part when moving to life up or lower down the display module along a second axis, and the first axis is orthogonal to the second axis.

11. The portable electronic device according to claim 10, wherein during a movement process of the display module, the display surface is parallel to the datum surface.

12. The portable electronic device according to claim 10, wherein the active part and the driven part are a convex part and a concave part corresponding to each other, and when the convex part moves out of the concave part, the display surface is lifted up relative to the datum surface.

13. The portable electronic device according to claim 10, wherein the active part and the driven part are a wedge-shaped concave part and a wedge-shaped convex part with contours complementary to each other.

14. The portable electronic device according to claim 10, wherein the transmission module comprises:
    at least one gear, rotatably disposed in the first body; and
    a rack, movably disposed in the first body and coupled to the gear, wherein the rack has the active part.

15. The portable electronic device according to claim 14, wherein the transmission module further comprises a power source connected to the gear, the first body and the second body are pivoted relative to each other by a pivot, and the power source and the pivot are coaxially disposed, so as to synchronize the gear with the pivot of the first body and the second body.

16. The portable electronic device according to claim 10, wherein the transmission module further comprises a magnetic member, disposed as a same structure as the active part and adjacent to the active part, the display module further comprises another magnetic member, disposed as a same structure as the driven part and adjacent to the driven part, and when the active part abuts the driven part to lift up the display module, the magnetic member and the another magnetic member correspond to each other and are magnetically attracted.

17. The portable electronic device according to claim 10, wherein the first body is a recessed structure, when the display surface is lifted up relative to the datum surface, a portion of the display module moves out of the recessed structure and forms a gap between the first body, and when the display surface is lowered down relative to the datum surface, the display module moves into the recessed structure such that the display surface and the datum surface are consistent.

18. The portable electronic device according to claim 10, wherein the display module comprises:
- a bearing member, having the driven part; and
- a display unit, disposed on the bearing member and having the display surface.

* * * * *